April 20, 1965  O. MÖDDER  3,178,982
GAUGE FOR A SAW OR THE LIKE
Filed Oct. 2, 1962  3 Sheets-Sheet 1

OTTO MÖDDER
INVENTOR.

April 20, 1965   O. MÖDDER   3,178,982
GAUGE FOR A SAW OR THE LIKE
Filed Oct. 2, 1962   3 Sheets-Sheet 2

OTTO MÖDDER
INVENTOR.

April 20, 1965  O. MÖDDER  3,178,982
GAUGE FOR A SAW OR THE LIKE
Filed Oct. 2, 1962  3 Sheets-Sheet 3

OTTO MÖDDER
INVENTOR.

BY

United States Patent Office  
3,178,982  
Patented Apr. 20, 1965

3,178,982
GAUGE FOR A SAW OR THE LIKE
Otto Mödder, Dahlbruch, Germany, assignor to Siemag, Siegener Maschinenbau G.m.b.H., Dahlbruch, Germany, a corporation of Germany
Filed Oct. 2, 1962, Ser. No. 227,951
7 Claims. (Cl. 83—467)

This invention relates to a gauge for a saw or the like and more particularly to a stop apparatus arranged to locate the ends of stock in a rolling mill prior to cutting.

In a rolling mill, after the product leaves the cooling bed it is common practice to arrange a large number of lengths of stock on a roller table and to cut it into commercial lengths by means of a shear or saw. Before cutting, the ends of the lengths of stock are aligned by means of a stop or gauge, the gauge being adjustable to regulate the lengths of material being cut and to hold the stock against movement during the cutting operation. In the past, such adjustable gauges have occupied considerable amount of space over the roller table and, at the same time, interfered with the movement of the saw longitudinally and transversely of the table. Gauges of this kind have also been large and unwieldy because of the necessity of avoiding interference with the saw as it moves across the table in performing the cutting operation. These and other difficulties experienced in the prior art devices have been obviated in a novel manner by the present invention.

It is, therefore, an outstanding object of the invention to provide a gauge for a cutting device which occupies very little space.

Another object of this invention is the provision of a rolling mill gauge associated with a roller table and with a shear or saw, which gauge is strong in construction and yet does not interfere with the operation of the shear or saw.

A further object of the present invention is the provision of a rolling mill shear gauge which lends itself readily to operation and to adjustment by an operator located a considerable distance from the shear.

It is another object of the instant invention to provide a rolling mill gauge for use with a shear or saw in which the massive operating and supporting elements are located a substantial distance away from the operative stopping surface.

With these and other objects in view, as will be apparent to those skilled in the art, the invention resides in the combination of parts set forth in the specification and covered by the claims appended hereto.

Figure 1:
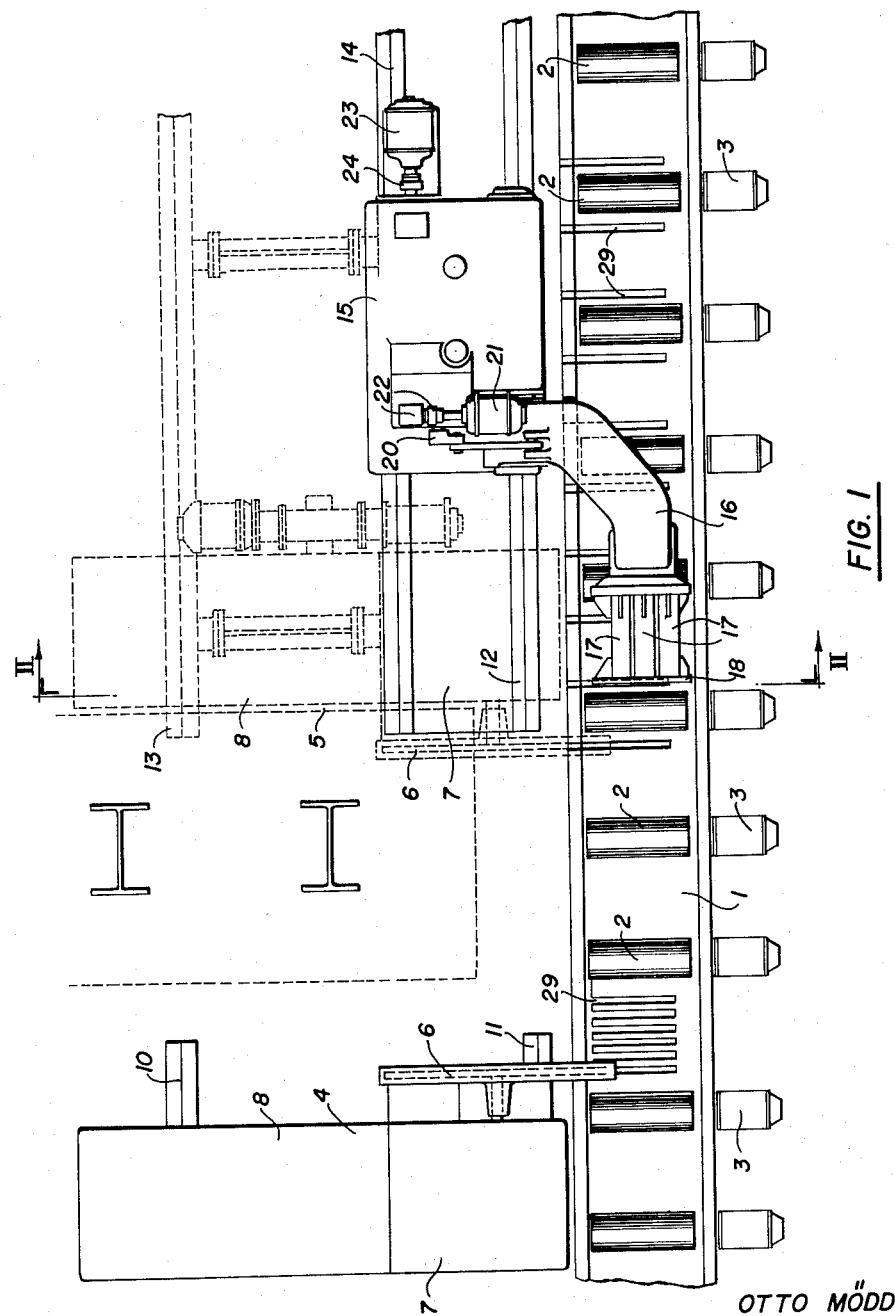
Figure 2:
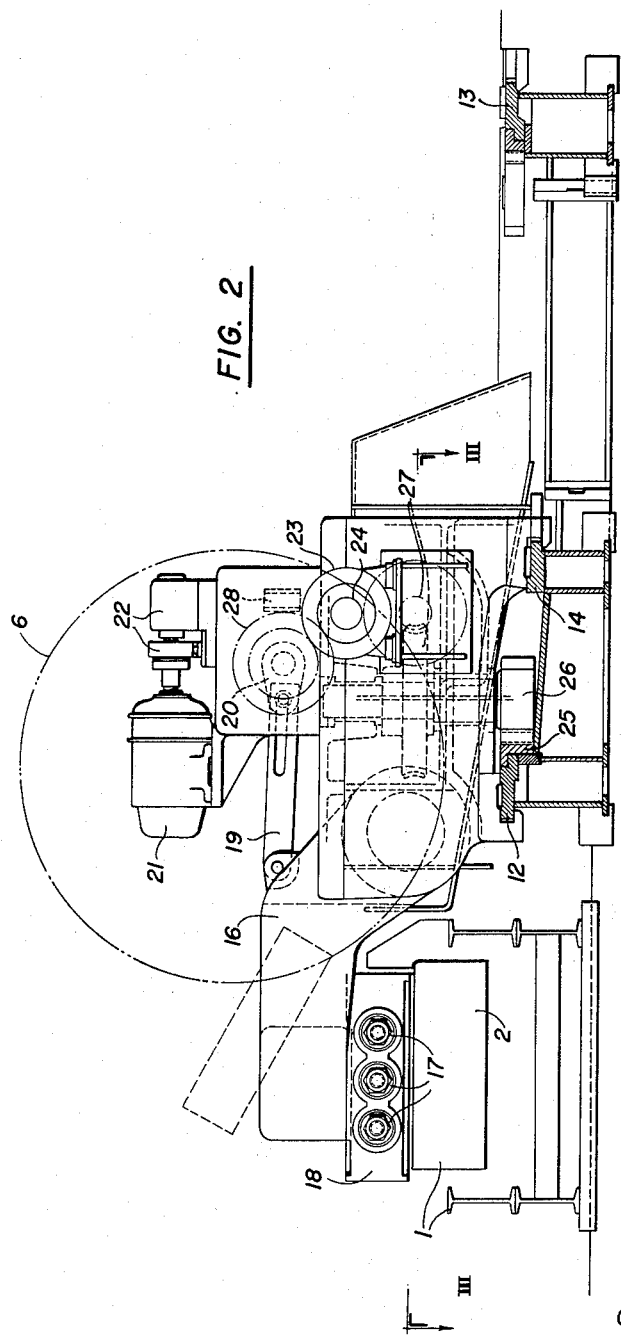
Figure 3:
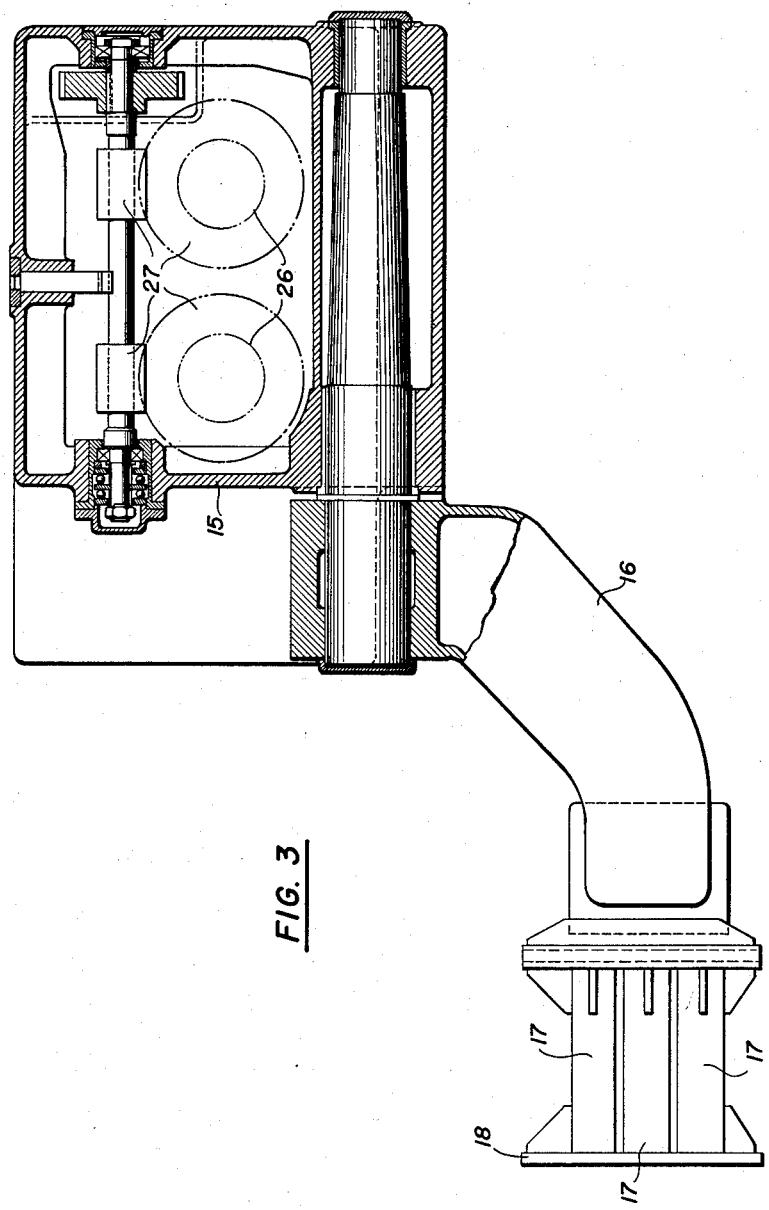

The character of the invention, however, may be best understood by reference to one of its structural forms as illustrated by the accompanying drawings in which:

FIG. 1 is a plan view of a portion of a steel mill showing a gauge incorporating the principles of the present invention, FIG. 2 is a vertical sectional view of the apparatus taken on the line II—II of FIG. 1, and FIG. 3 is a horizontal sectional view of the apparatus taken on the line III—III of FIG. 2.

In a general way, the present invention provides apparatus in which one of the rails for supporting an adjustable saw serves at the same time as a support for the slide on which the gauge is mounted. Between the rails for the saw slide is mounted an auxiliary rail on which the gauge slide is supported, the slide being supported on one of the main rails and on the auxiliary rail. The center of gravity of the entire gauge arrangement is favorably located by placing the auxiliary rail considerably lower than the main guide rails. A stationary gear rack is mounted on one of the main rails and is used for driving the saw slide during adjustment thereof. A bevel gear mounted on the gauge slide engages the same gear rack for the movement of the gauge. Furthermore, the gauge plate is mounted on the free end of a lever which is supported in a swingable manner on the gauge slide and can be lowered or lifted over the roller table by a driving means. The arm which carries the gauge plate is formed with a transverse portion which is hingedly attached to the slide and a longitudinal portion which extends parallel to the roller table and on which the gauge plate is mounted.

Referring to the drawings, the roller table 1 is provided in the usual manner with a large number of conveyor rollers 2 which, in turn, are driven by individual motors 3. The table is adapted to receive rolling mill product after it leaves the mill and cutting devices, such as saws 4 and 5 are mounted beside it. The saw 5 is provided with a saw blade 6 while the saw 4 is similarly provided with a saw blade 6a. The blade 6 of the saw 5 may be moved transversely into the path of the roller table 1 by means of a saw carrier 7, while the saw blade 6a is similarly provided with a saw carrier 7a. The saw 5 is also provided with a slide 8 on which the saw carrier 6 is mounted. Similarly the saw 4 is provided with a slide 8a on which the saw carrier 7a is mounted. The slides 8 and 8a are movable parallel to the roller table 1. The saw blade 6a is adjustable between two rollers 2. The saw 5, however, is adjustable along a much greater path and rests on main rails 12 and 13. These rails are parallel and in the same horizontal plane parallel to the length of the roller table 1. A drive means is mounted on the slide 8 to cause the longitudinal setting adjustment of the saw 5.

Between the main rails 12 and 13, which are associated with the saw 5, is arranged an auxiliary rail 14 which supports a gauge slide 15 in conjunction with the rail 12. A swinging arm 16 is mounted on the gauge slide. The arm 16 is formed to provide a transverse portion which extends from the slide 15 at a right angle to the roller table and a second portion which extends over the roller table longitudinally thereof. The arm is provided at its outer end with a gauge plate 18 which is attached to the free end of the arm 16 by means of extension bars 17. The arm 16 is pivoted to the slide 15 for swinging motion about the horizontal axis X—X and this swinging motion takes place under the impetus of a pull rod 19 which is connected at one end to the arm 16 at a point substantially spaced from the axis X—X and is connected at its other end to a crank 20. The crank is connected to and driven by an adjusting device 22 which is driven by an electric motor 21. Another adjusting device 24 is mounted on the slide 15 and is driven by an electric motor 23.

To obtain a favorable center of gravity for the gauge apparatus, the auxiliary rail 14 is arranged substantially lower than the main rail 12. A stationary gear rack 25 is mounted on the main rail 12 and is engaged by a bevel gear 26 which is driven by the electric motor 23 through the adjusting device 24 which is in the form of a gear box. Operating through a worm gear 27, the drive means (not shown) for the saw slide 8 operates on the same gear rack 25.

The operation of the apparatus will now be readily understood in view of the above description. The product of the rolling mill lies on the roller table 1 from the left-hand side. This stock may consist of one large piece of stock, or a plurality of smaller pieces arranged side-by-side on the rollers 2. The rollers are rotated by the individual drive motors 3 and the stock moves along the table from left to right in FIG. 1. Assuming that the gauge is in such a condition that the gauge plate 18 is adjacent the roller table 1, the incoming stock strikes the plate and is located and held thereby. Suitable adjustments of the saws 4 and 5 will permit the stock to be cut into suitable lengths by movement of the saw blades 6 and 6a transversely of the roller table 1 because of the movement of the saw carriers 7 and 7a, respectively, relative to the slides 8 and 8a, respectively. When the material has been cut, it is necessary to remove the gauge from the vicinity of the roller table and, for this purpose, the motor 21 is energized and operates through the adjusting device 22 to rotate the crank 20, thus causing the pull rod 19 to rotate the arm in an upward direction about the horizontal axis X—X. The arm, in so moving away from the table, rises high enough so that it misses any portions of the saw that may extend upwardly from the main body of the saw. When the next body of rolling mill stock approaches the saws, the action is reversed to bring the gauge plate 18 down into proximity to the roller table. The gauge may be adjusted by energization of the motor 23 thus operating through the adjusting device 24 and the worm gear 27 to rotate the bevel gear 26. The bevel gear is in engagement with the rack 25 and this causes movement of the entire gauge assembly along the rails 12 and 14. As is evident in FIG. 3, the longitudinal movement of the gauge may take place in the preferred embodiment by the use of two worm gears 27 and 27a operating with two bevel gears 26 and 26a.

When cover plates are arranged between the rollers 2, as shown in FIG. 1, it may be necessary that these cover plates have slots 29 to permit the saw blades to move across the table.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A gauge for use in a rolling mill with a conveyor table and a stock cutting device, comprising
   (a) a main rail,
   (b) an auxiliary rail extending parallel to the main rail,
   (c) a slide mounted on the main rail and the auxiliary rail,
   (d) an arm mounted on the slide for swinging motion about a horizontal axis, the arm having a first portion which extends transversely of the conveyor table and a second portion which overlies and extends parallel to the conveyor table, and
   (e) a gauge plate mounted on a free end of the said second portion.

2. A gauge for use in a rolling mill with a conveyor table and a stock cutting device, comprising
   (a) a pair of parallel main rails lying in a generally horizontal plane,
   (b) an auxiliary rail lying between and extending parallel to the main rails, the auxiliary rail lying a substantial distance below the plane of the main rails,
   (c) a slide mounted on one of the main rails and the auxiliary rail,
   (d) an arm hingedly mounted on the slide, and
   (e) a gauge plate mounted on a free end of the arm.

3. A gauge for use in a rolling mill with a conveyor table and a stock cutting device, comprising
   (a) a pair of main rails having a gear rack,
   (b) an auxiliary rail extending parallel to the main rail,
   (c) a slide mounted on one of the main rails and the auxiliary rail, the slide including a motor-driven drive having a gear which engages the said gear rack,
   (d) an arm hingedly mounted on the slide,
   (e) a gauge plate mounted on a free end of the said arm.

4. A gauge for use in a rolling mill with a conveyor table and a stock cutting device, comprising
   (a) a pair of parallel main rails lying in a generally horizontal plane,
   (b) an auxiliary rail lying between and extending parallel to the main rails, the auxiliary rail lying a substantial distance below the plane of the main rails,
   (c) a slide mounted on one of the main rails and the auxiliary rail,
   (d) an arm hingedly mounted on the slide, the arm having a first portion which extends transversely of the conveyor table and a second portion which overlies and extends parallel to the conveyor table, and
   (e) a gauge plate mounted on a free end of the said second portion.

5. A gauge as recited in claim 4, wherein the arm is mounted on the slide for swinging movement about a horizontal axis.

6. A gauge as recited in claim 4, wherein one of the main rails is provided with a gear rack and the gauge slide is provided with a motor-driven drive having a gear which engages the said rack.

7. A gauge as recited in claim 4, wherein the gauge slide carries a motor-driven drive which causes the arm to move from a position close to the roller table to a position removed therefrom.

References Cited by the Examiner
UNITED STATES PATENTS

| | | | |
|---|---|---|---|
| 619,520 | 2/99 | Veilgaard et al. | 83—560 X |
| 954,396 | 4/10 | Klindworth | 83—467 |
| 2,446,146 | 7/48 | Tucker | 83—391 |

FOREIGN PATENTS 1,212,542  10/59  France.

LEON PEAR, *Primary Examiner.*